US 8,175,578 B2

(12) United States Patent
McCown et al.

(10) Patent No.: US 8,175,578 B2
(45) Date of Patent: *May 8, 2012

(54) WIRELESS DEVICE MONITORING METHODS, WIRELESS DEVICE MONITORING SYSTEMS, AND ARTICLES OF MANUFACTURE

(75) Inventors: Steven H. McCown, Rigby, ID (US);
Kurt W. Derr, Idaho Falls, ID (US);
Kenneth W. Rohde, Idaho Falls, ID (US)

(73) Assignee: Battelle Energy Alliance, LLC, Idaho Falls, OH (US)

( * ) Notice: Subject to any disclaimer, the term of this patent is extended or adjusted under 35 U.S.C. 154(b) by 1174 days.

This patent is subject to a terminal disclaimer.

(21) Appl. No.: 11/745,319

(22) Filed: May 7, 2007

(65) Prior Publication Data
US 2008/0280592 A1 Nov. 13, 2008

(51) Int. Cl.
*H04M 1/66* (2006.01)
(52) U.S. Cl. ............... 455/411; 455/410; 455/414.1; 455/456.1; 380/247
(58) Field of Classification Search ............ 455/411.1, 455/410, 456.4, 411, 414.1, 456.1; 380/247
See application file for complete search history.

(56) References Cited

U.S. PATENT DOCUMENTS

| | | | |
|---|---|---|---|
| 6,779,115 B1 | 8/2004 | Naim | |
| 6,831,982 B1 | 12/2004 | Hughes et al. | |
| 7,024,192 B2 * | 4/2006 | Aoki et al. | 455/432.3 |
| 7,024,395 B1 | 4/2006 | McCown et al. | |
| 7,046,990 B2 * | 5/2006 | Grego et al. | 455/410 |
| 7,206,569 B2 * | 4/2007 | Erskine et al. | 455/405 |
| 2004/0031856 A1 | 2/2004 | Atsmon et al. | |
| 2004/0107219 A1 | 6/2004 | Rosenberger | |
| 2005/0038707 A1 | 2/2005 | Roever et al. | |
| 2005/0068169 A1 | 3/2005 | Copley et al. | |
| 2005/0120225 A1 | 6/2005 | Kirsch et al. | |
| 2005/0188194 A1 | 8/2005 | Fascenda | |
| 2005/0234860 A1 | 10/2005 | Roever et al. | |
| 2005/0250440 A1 | 11/2005 | Zhou et al. | |
| 2006/0135121 A1 | 6/2006 | Abedi et al. | |
| 2006/0165078 A1 | 7/2006 | Gopinath et al. | |
| 2007/0011729 A1 | 1/2007 | White | |
| 2007/0057038 A1 | 3/2007 | Gannon | |
| 2007/0087756 A1 | 4/2007 | Hoffberg | |
| 2007/0198432 A1 | 8/2007 | Pitroda et al. | |
| 2007/0226807 A1 | 9/2007 | Ginter et al. | |
| 2007/0241182 A1 | 10/2007 | Buer | |

(Continued)

OTHER PUBLICATIONS

"Multi-Tasking Cell Phone signal Detection System"; www.antennasystems.com/cellphonedetector.html; copyright 2004-2006; printed Apr. 6, 2006; 3 pp.

(Continued)

*Primary Examiner* — Nghi Ly
(74) *Attorney, Agent, or Firm* — SNR Denton US LLP

(57) ABSTRACT

Wireless device monitoring methods, wireless device monitoring systems, and articles of manufacture are described. According to one embodiment, a wireless device monitoring method includes accessing device configuration information of a wireless device present at a secure area, wherein the device configuration information comprises information regarding a configuration of the wireless device, accessing stored information corresponding to the wireless device, wherein the stored information comprises information regarding the configuration of the wireless device, comparing the device configuration information with the stored information, and indicating the wireless device as one of authorized and unauthorized for presence at the secure area using the comparing.

29 Claims, 4 Drawing Sheets

U.S. PATENT DOCUMENTS

| | | | |
|---|---|---|---|
| 2007/0250393 | A1 | 10/2007 | Alberth, Jr. et al. |
| 2008/0010215 | A1 | 1/2008 | Rackley, III et al. |
| 2008/0025238 | A1 | 1/2008 | McCown et al. |
| 2008/0291013 | A1* | 11/2008 | McCown et al. ........ 340/539.13 |
| 2009/0216680 | A1 | 8/2009 | McCown et al. |
| 2009/0216681 | A1 | 8/2009 | McCown et al. |

OTHER PUBLICATIONS

U.S. Appl. No. 11/460,662; "Radio Frequency Detection Assembly and Method for Detecting Radio Frequencies"; filed Jul. 28, 2006; 28 pp.

"FBI taps cell phone mic as eavsdropping tool"; http://news.com.com/210-1029_3-6140191.html ; Dec. 1, 2006; 4 pp.

International Search Report and Written Opinion, International Application No. PCT/US08/62675, International Filing Date May 5, 2008.

Bellare, Mihir, et al., "Keying Hash Funtions for Message Authentication", Jun. 1996, pp. 1-19.

Bellare, Mihir, et al., "Message Authentication using Hash Functions—The HMAC Construction", RSA Laboratories' CryptoBytes, 2(1):1-5, Spring 1996.

Borselius, N., "Multi-agent system security for mobile communication", Technical Report, Royal Holloway University of London, Sep. 1, 2003.

Heydt-Benjamin, Thomas S. et al., "RFID Payment Card Vulnerabilities Technical Report", Oct. 11, 2006, pp. 1-6.

Heydt-Benjamin, Thomas S. et al., "Vulnerabilities in First-Generation RFID-enabled Credit Cards", Oct. 22, 2006, pp. 1-17.

KoolSpan, "KoolSpan OEM solutions" KoolSpan TrustChip Family website located at: HTTP://wwww.koolspan.com/oem, printed on Oct. 15, 2007.

KoolSpan, "KoolSpan TrustChip Solutions for OEMs" website located at: HTTP://wwww.koolspan.com/oem/trust_chiphardware.htm, printed on Oct. 15, 2007.

KoolSpan, "White Paper: An innovative integration of advanced crypto hardware and software, enabling simple secure network connectivity for enterprise and industrial applications", KoolSpan Foundation Technology, no date.

PCT, International Search Report and Written Opinion, PCT/IB08/03377 (International filing date Dec. 8, 2008), mailed Jul. 13, 2009.

PCT, International Search Report and Written Opinion, PCT/US09/32273 (International filing date Jan. 28, 2009), mailed Mar. 13, 2009.

PCT, International Search Report and Written Opinion, PCT/US09/32279 (International filing date Jan. 28, 2009), mailed Mar. 16, 2009.

"RFID Reference Model", CE RFID, Version 2007 2-1, Jan. 10, 2007.

"The Keyed-Hashed Message Authentication Code (HMAC)", FIPS PUB 198, Mar. 6, 2002.

Wong, Ford-Long et al., "Repairing the Bluetooth pairing protocol", Security Protocols 2005, pp. 1-17.

PCT, International Search Report and Written Opinion, PCT/US09/35205 (International filing date Feb. 26, 2009), mailed Nov. 6, 2009.

"Multi-Tasking Cell Phone Signal Detection System", www.antennasystems.com/cellphonedetector.html, copyright 2004-2006; printed Apr. 6, 2006, 3 pages.

* cited by examiner

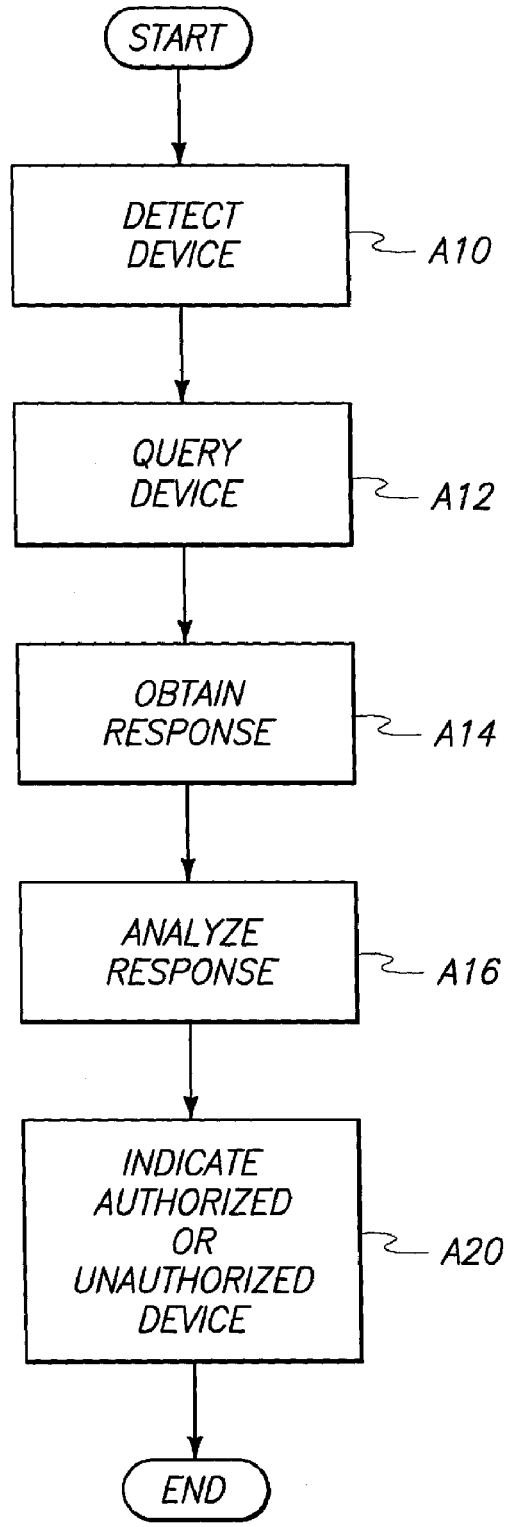

WIRELESS DEVICE MONITORING METHODS, WIRELESS DEVICE MONITORING SYSTEMS, AND ARTICLES OF MANUFACTURE

GOVERNMENT RIGHTS STATEMENT

The United States Government has certain rights in this invention pursuant to Contract No. DE-AC07-05ID14517 between the United States Department of Energy and Battelle Energy Alliance, LLC.

TECHNICAL FIELD

The present disclosure relates to wireless device monitoring methods, wireless device monitoring systems, and articles of manufacture.

BACKGROUND OF THE DISCLOSURE

Wireless devices such as cell phones, Blackberries, two-way pagers, wireless headsets and keyboards, etc. have become an integral part of today's lifestyle. This is especially true in the business world where voice communication, e-mail, instant messaging, electronic calendars, etc. have become the standard way of conducting business operations. It has been recognized that wireless devices can be used as tracking devices (via integrated GPS chips), staging areas for Denial of Service (DoS) and other attacks, as well as "roving bugs" wherein attackers remotely turn on device microphones to eavesdrop.

Accordingly, concerns have been raised regarding use of wireless devices for espionage. For example, concerns exist regarding use of wireless devices for corporate espionage. When executives or other corporate members meet to discuss internal strategies and operations, they wish to do so without the fear of divulging their entire meeting to competing corporations. One possible reaction to the threat of introducing wireless devices into proprietary meetings is to completely ban them from meeting rooms and other sensitive areas of corporate activity. This solution is unacceptable in some situations as meeting participants may need to be reachable, even when they are in meetings, as evidenced by the growing proliferation of Blackberry devices.

BRIEF DESCRIPTION OF THE DRAWINGS

Preferred embodiments of the disclosure are described below with reference to the following accompanying drawings.

FIG. 5 is a flow chart of a process of verifying a wireless device according to one embodiment.

DETAILED DESCRIPTION OF THE PREFERRED EMBODIMENTS

Figure 1:
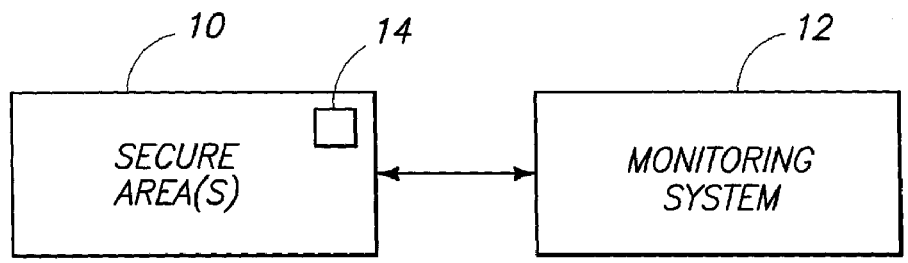
FIG. 1 is a functional block diagram of a monitoring system associated with one or more secure area to be monitoring in one embodiment.

This disclosure of the invention is submitted in furtherance of the constitutional purposes of the U.S. Patent Laws "to promote the progress of science and useful arts" (Article 1, Section 8).

According to some embodiments of the disclosure, apparatus and methods for monitoring for the presence of and/or verifying wireless devices are described. In one embodiment, monitoring can occur at one or more secure area(s), for example, areas wherein it is desired to know the presence and/or verification of wireless devices, such as personal electronic devices (PEDs), including for example cellular phones, Blackberry devices, personal digital assistants (PDAs), two-way pagers, wireless keyboards, wireless headsets, etc. Verification operations of wireless devices may be performed by the apparatus and methods in one embodiment. In addition, an indication, such as an alarm, may be generated responsive to the detection and/or verification operations performed with respect to wireless devices. Authorized wireless devices may be permitted into secure areas while discovering and disallowing unauthorized wireless devices into the secure areas. Additional aspects of the disclosure are described in the illustrative embodiments below.

According to one embodiment, a wireless device monitoring method comprises accessing device configuration information of a wireless device present at a secure area, wherein the device configuration information comprises information regarding a configuration of the wireless device, accessing stored information corresponding to the wireless device, wherein the stored information comprises information regarding the configuration of the wireless device, comparing the device configuration information with the stored information, and indicating the wireless device as one of authorized and unauthorized for presence at the secure area using the comparing.

According to an additional embodiment, a wireless device monitoring method comprises associating a node device with a secure area, detecting presence of a plurality of wireless devices at the secure area using the node device, communicating with respect to individual ones of the wireless devices after the detecting of the respective ones of the wireless devices using the node device, and indicating at least one of the wireless devices as being unauthorized at the secure area.

According to yet another embodiment, wireless device monitoring system comprises an antenna configured to receive wireless communications at a secure area, communications circuitry coupled with the antenna and configured to receive the wireless communications and to output wireless communications using the antenna, and processing circuitry coupled with the communications circuitry and configured to process the wireless communications received by the communications circuitry to detect a presence of a wireless device, to control the outputting of the wireless communications to request information from the wireless device, and to generate an indication of the wireless device as being one of authorized and unauthorized with respect to the secure area after the outputting of the wireless communications.

According to another additional embodiment, a wireless device monitoring system comprises a plurality of node devices associated with respective ones of a plurality of secure areas, wherein the node devices are individually configured to detect the presence of wireless devices at a respective one of the secure areas associated with the individual node device and to obtain information regarding the wireless devices from the wireless devices, and a management device coupled with the node devices and configured to receive the information regarding the wireless devices from the node devices, to analyze the information, and to indicate, for an individual one of the node devices, whether respective ones of the wireless devices are authorized or unauthorized with respect to the respective one of the secure areas.

According to still another embodiment, a wireless device monitoring system comprises a first organization comprising a secure area, a second organization configured to store information regarding a plurality of wireless devices associated with the second organization, and wherein a monitoring device of the first organization is configured to indicate one of the wireless devices of the second organization as being one of authorized and unauthorized with respect to the secure area of the first organization using the stored information regarding the one of the wireless devices.

According to still another additional embodiment, an article of manufacture comprises media comprising programming configured to cause processing circuitry to perform processing comprising first accessing information from a wireless device with respect to a secure area, second accessing stored information regarding the wireless device, comparing the accessed information and the stored information to determine whether the wireless device is authorized or unauthorized with respect to the secure area, and indicating the wireless device as being one of authorized and unauthorized with respect to the secure area responsive to the comparison.

Referring to FIG. 1, one or more secure area(s) 10 and an associated wireless device monitoring system 12 are shown. Secure areas 10 may be any areas wherein information regarding wireless devices 14 present in the areas is desired to be known. For example, in one application, secure areas 10 may be different conference rooms (e.g., of a corporation, government entity or other organization) wherein sensitive material may be discussed and it is desired to know the presence and verification of wireless devices 14 in the areas. In one illustrative embodiment, one or more monitoring or node device of monitoring system 12 discussed below may be positioned adjacent to respective point(s) of ingress and egress of secure areas 10 to provide wireless device monitoring functions. In another arrangement, a single node device with extended range may monitor a plurality of points of ingress and egress of respective secure area(s) 10. Other embodiments and/or applications of use are possible.

Monitoring system 12 may be implemented in different configurations corresponding to respective different applications and secure areas 10 to be monitored. For example, for applications where a single secure area 10 is to be monitored, monitoring system 12 may include a single node device configured to provide wireless device monitoring and analysis functions with respect to the single secure area 10. For applications wherein a plurality of secure areas 10 are to be monitored, monitoring system 12 may include a plurality of node devices which communicate with a centralized management device which may provide analysis of information provided by the node devices. In another embodiment, the management device may communicate with devices external of the monitoring system 12 (for example associated with another corporation or other organization) and which implement one or more analysis aspects of the disclosure. Details of these example embodiments are described below and monitoring system 12 may be implemented differently in other embodiments apart from the examples described herein.

Wireless devices 14 may be individually configured to implement operations in conjunction with monitoring system 12 in one embodiment. For example, wireless devices 14 may individually include authentication software which configures the device 14 to receive and process authentication requests from monitoring system 12, gather appropriate information, and return appropriate replies to monitoring system 12. The authentication software may include embedded digital signatures and/or encryption keys to perform signing and/or encryption functions.

Figure 2:
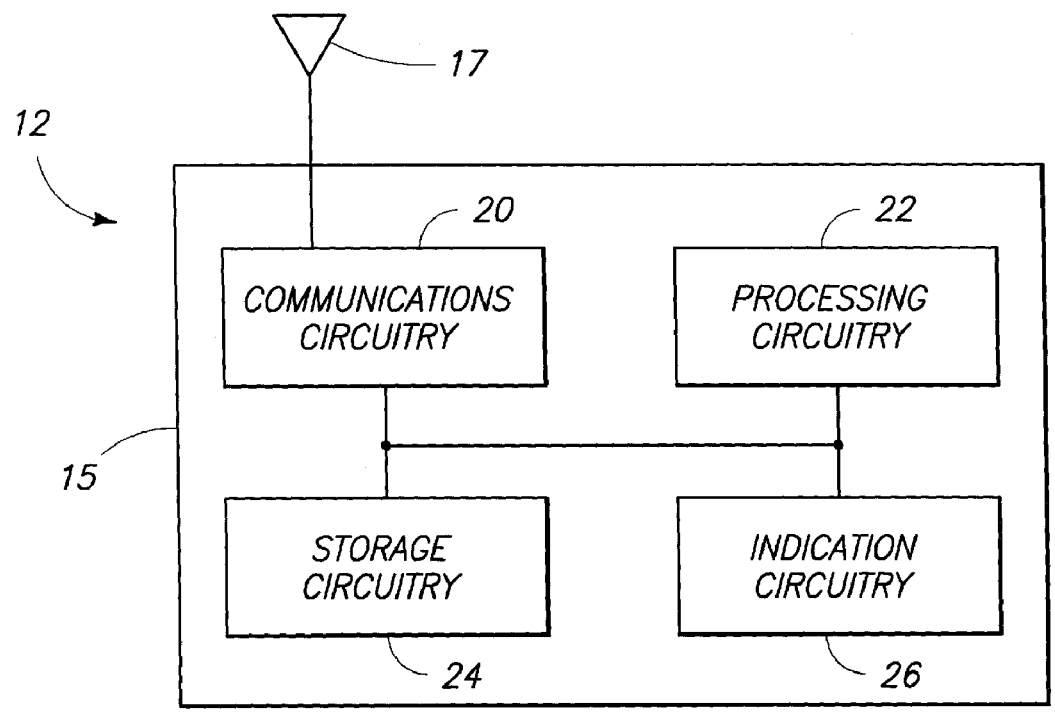
FIG. 2 is a functional block diagram of circuit components of one or more device of a monitoring system according to one embodiment.

Referring to FIG. 2, one possible configuration of a device 15 of monitoring system 12 is shown according to one embodiment. The illustrated device 15 may be the above-described node device and/or management device in some examples. The depicted device 15 includes communications circuitry 20, processing circuitry 22, storage circuitry 24, and indication circuitry 26 in the illustrated configuration. Other arrangements are possible including more, less and/or alternative components.

Communications circuitry 20 is arranged to implement wireless and/or wired communications of device 15. For example, communications circuitry 20 may be arranged to communicate information bi-directionally with respect to wireless devices 14 and other devices of system 12 in some embodiments. Communications circuitry 20 may be coupled with an antenna 17 and include wireless transceiver circuitry for wireless communications with devices 14 and may also include as a network interface card (NIC), serial or parallel connection, USB port, Firewire interface, flash memory interface, floppy disk drive, or any other suitable arrangement for communicating with respect to public (e.g., Internet) and/or private networks or other wired arrangements. One embodiment of communications circuitry 20 may include an RF detection module to detect wireless devices 14, an RF interrogation module to output communications and receive replies from wireless devices 14, and/or a module to communicate with other devices of system 12.

In one embodiment, processing circuitry 22 is arranged to process data, control data access and storage, issue commands, and control other desired operations. Processing circuitry 22 may comprise circuitry configured to implement desired programming provided by appropriate media in at least one embodiment. For example, the processing circuitry 22 may be implemented as one or more of a processor and/or other structure configured to execute executable instructions including, for example, software and/or firmware instructions, and/or hardware circuitry. Exemplary embodiments of processing circuitry 22 include hardware logic, PGA, FPGA, ASIC, state machines, and/or other structures alone or in combination with a processor. These examples of processing circuitry 22 are for illustration and other configurations are possible.

The storage circuitry 24 is configured to store programming such as executable code or instructions (e.g., software and/or firmware), electronic data, databases, or other digital information and may include processor-usable media. An example of a database may include information regarding a plurality of wireless devices 14 which may be present in one or more secure areas 10.

Processor-usable media may be embodied in any computer program product(s) or article of manufacture(s) which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry described above and/or communicated via a network or other transmission media and configured to control appropriate processing circuitry. For example, programming may be provided via appropriate media including, for example, embodied within articles of manufacture, embodied within a data signal (e.g., modulated carrier wave, data packets, digital representations, etc.) communicated via an appropriate transmission medium, such as a communication network (e.g., the Internet and/or a private network), wired electrical connection, optical connection and/or electromagnetic energy, for example, via a communications interface, or provided using other appropriate communication structure or medium. Exemplary programming including processor-usable code may be communicated as a data signal embodied in a carrier wave in but one example.

Indication circuitry 26 is configured to generate an indication regarding presence of wireless devices 14 at the secure areas 10 being monitored. In one embodiment, circuitry 26 generates a human perceptible indication, such as a silent, visual and/or audible alarm, at the locations of the secure areas 10 to indicate the presence of one or more wireless device 14. Indication circuitry 26 may include a display to convey information regarding wireless devices 14 to an operator. Indications may indicate presence of authorized or unauthorized devices 14 at secure areas 10.

Figure 3:
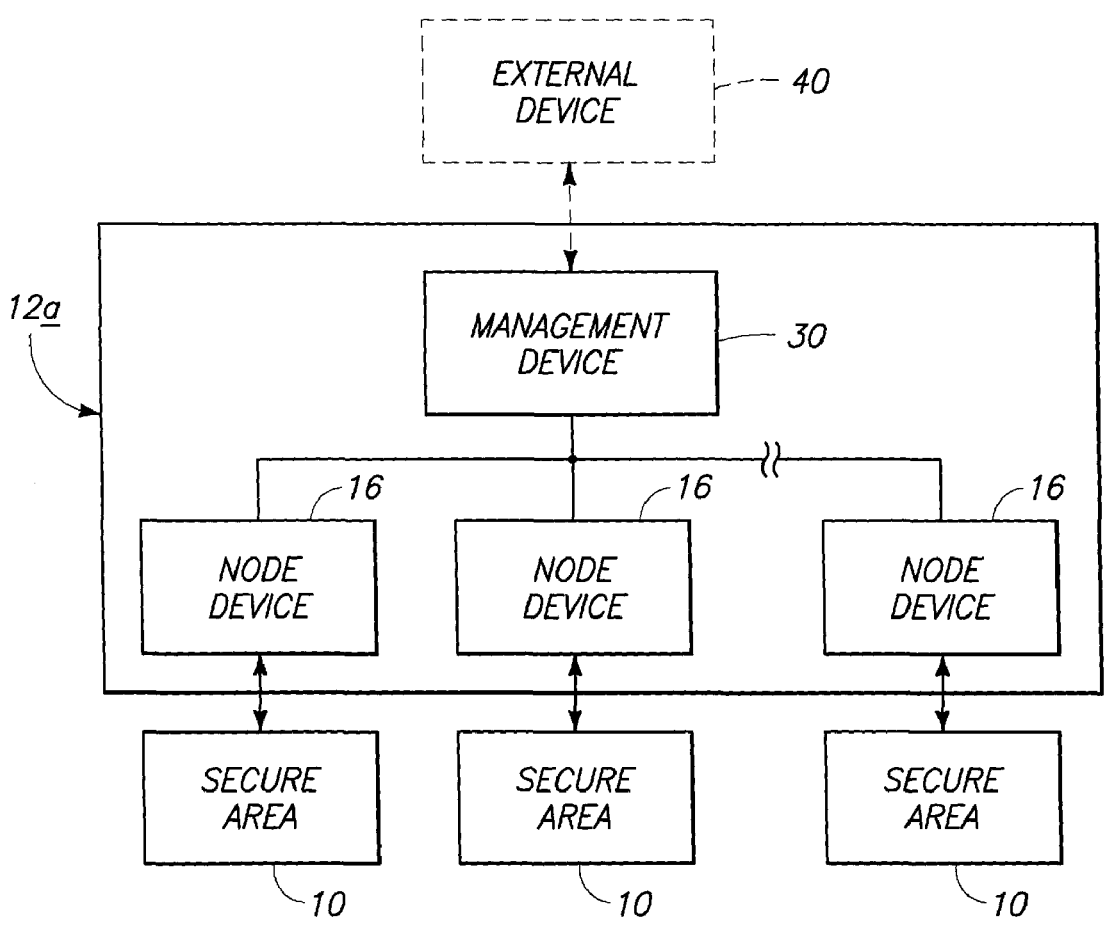
FIG. 3 is a functional block diagram of a monitoring system according to one embodiment.

Referring to FIG. 3, an arrangement of monitoring system 12a configured to monitor a plurality of secure areas 10 is shown. The arrangement of monitoring system 12a includes a plurality of node devices 16 associated with and configured to monitor a plurality of respective secure areas 10. Node devices 16 are configured to communicate with a management device 30, which may be implemented as a server in one configuration. Node devices 16 and management device 30 may be individually configured according to device 15 in one embodiment.

As described in further detail below, node devices 16 may communicate with wireless devices 14 and output communications to management device 30 for analysis. In one embodiment (e.g., single organization application), management device 30 performs the analysis. In another embodiment (e.g., multiple organization application), management device 30 may communicate with an external device 40 which performs the analysis. In some arrangements, monitoring system 12a is implemented within one organization or entity (e.g., corporation) and external device 40 is associated with a different organization or entity. Other embodiments are possible.

Figure 4:
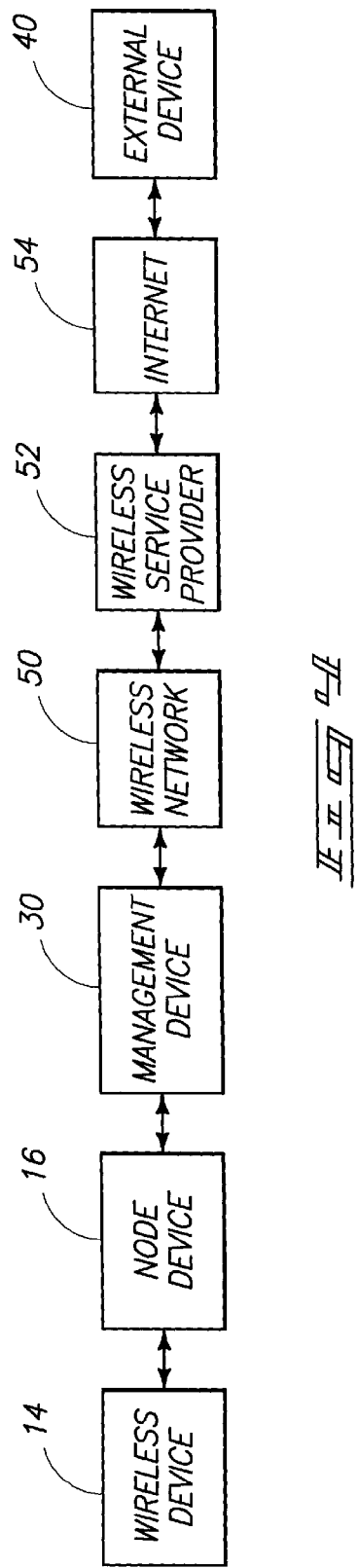
FIG. 4 is an illustrative flow diagram depicting verification operations and components according to one embodiment.

Referring to FIG. 4, monitoring secure areas 10 with respect to wireless devices 14 is shown and described according to the above-identified arrangements of monitoring systems 12, 12a. The operations of devices 18, 30, 40 of FIG. 4 may be implemented using only node device 16 in implementations of monitoring system 12 including just a single node device 16 and no management device 30. In addition, operations of device 40 may be implemented within device 30 in embodiments wherein monitoring and analysis is performed within a single organization or system.

Initially, a node device 16 is configured to monitor for the presence of a wireless device 14 at a respective secure area 10, for example, adjacent to a point of ingress of the secure area 10 in one embodiment. In one embodiment, node device 16 is configured to scan frequencies of use of wireless devices 14 and may detect devices 14 by RF signals emitted therefrom (for example when the device 14 is communicating with other devices or servers) and received by communication circuitry 20 (FIG. 2). Additional details of detection of wireless devices 14 according to one embodiment are described in a co-pending U.S. patent application entitled "Radio Frequency Detection Assembly and Method for Detecting Radio Frequencies," having Ser. No. 11/460,662, filed Jul. 28, 2006, naming Steven H. McCown and Kurt W. Derr as inventors, and the teachings of which are incorporated herein by reference.

Following the detection of a wireless device 14, node device 16 may output a communication. The communication to the wireless device 14 may include an identifier (e.g., authentication ID) to the wireless device 14 which identifies the node device 16. The communication may include one or more challenge, such as "what is your unique device identifier (ID)?," "are you enrolled in a corporate PED server?" and "who is your corporate PED server?" In one embodiment, the communication may include a request for device configuration information from the wireless device 14 which corresponds to a present configuration (e.g., all system files and settings) of the wireless device 14.

In response, wireless device 14 may formulate a reply communication such as a digitally signed response. The response may include a device identifier, an identifier of the corporate PED server (CPS) associated with the wireless device 14, the device configuration information (e.g., in the form of an encrypted digital hash) and/or additional information. In one embodiment, an encrypted digital hash (EDH) is conducted by a wireless device 14 upon itself. For example, the device 14 may use a CPS-specified signing key to compute a digital hash of its configuration information (e.g., internal operating system files/data, user and/or CPS installed applications/data, etc).

In another embodiment, node device 16 may communicate session tokens (STs) to the wireless devices 14 upon detection of the wireless devices 14. Plural session tokens may be generated as unique identifiers for respective interrogation sessions of detected wireless devices 14. Wireless devices 14 may include the respective session tokens in the computations of the digitally signed responses. Usage of the session tokens may be used to ensure that previous digitally signed responses of devices 14 are not archived for future use and may preclude spyware or malware from masquerading as legitimate devices 14. When authenticating wireless devices 14, node device 16 may take into account previous stored responses from respective devices 14 and respective session tokens when analyzing current responses of devices 14.

Furthermore, according to an additional embodiment, an insertion point may be communicated from node device 16 to wireless device 14 instructing device 14 of where to insert the session token into the hashing function (e.g., after the $5^{th}$ file, after the $25^{th}$ file, etc.). Specifying the location of the session token at a certain index according to one embodiment may help preclude overload attacks against digital signature algorithms. Node devices 16 may archive digital hashes of individual files or setting groups as opposed to a single hash of all information in one embodiment. Archiving may be implemented when wireless devices 14 are registered into service and at known system update times in some examples.

Depending upon the implementation, node device 16 may analyze the information of the response or communicate the response to a remote device (e.g., management device 30 or external device 40 (if present)) for analysis. Node device 16 may generate an alarm or other indication if wireless device 14 fails to reply indicating the presence of perhaps an unauthorized device with respect to the secure area 10.

In addition, an alarm or other indication may be generated by node device 16, management device 30, external device 40 and/or other circuitry responsive to analysis of the response. As mentioned above, the response may include device configuration information. The device ID and device configuration information may be analyzed to determine whether an alarm or other indication is to be generated. In one embodiment, the appropriate node device 16, management device 30 or external device 40 (depending upon the implementation of the monitoring system 12, 12*a*) may include a database including a list of wireless devices 14 authorized to be present in a respective secure area 10. An alarm may be generated if the analyzing device fails to recognize the wireless device 14 as an authorized device.

In another example, the device configuration information of wireless device 14 is analyzed to determine if any unauthorized changes have been made to the configuration of an otherwise authorized wireless device 14. For example, the appropriate device 16, 30, 40 may use the device ID of the wireless device 14 to access stored configuration information of the respective wireless device 14 from a database. The stored configuration information may comprise information regarding a configuration of the device 14 at an initial moment in time (e.g., a hash of the configuration information at a time of issuance of device 14 to an employee). In one embodiment, monitoring system 12 performs operations at subsequent moments in time (e.g., when device 14 is detected at a location of a secure area 10) to verify that the configuration of the wireless device 14 has not been modified since the initial moment in time. One or more of devices 16, 30, 40 may issue an alarm or other indication responsive to a change of the configuration of the wireless device 14. The stored configuration information may be in the form of a hash and the respective device 16, 30, 40 performing the device configuration analysis may compare a hash of the reply from the wireless device 14 with the stored hash to determine whether the configuration has been changed and may issue an appropriate alarm or indication responsive to the analysis in one embodiment. For example, if an operating system file, CPS-installed file, or controlled setting has been modified or if an application has been installed, the hash of the received device configuration information will compute differently than the stored hash indicating that the wireless device 14 may have been modified by a malicious attacker or otherwise compromised.

In another embodiment, node device 16 may initiate a communication to wireless device 14 which includes a Node Identification Value (NIV) upon detection of the presence of wireless device 14. The NIV may reference the communicating node device 16 without identifying it directly in one embodiment. For example, a hash may be taken of an actual node ID of the node device 16 and combined with a timestamp of the request to form the NIV. The wireless device 14 may decode the NIV and determine whether it is desired to reply or not (an alarm may be issued if device 14 does not reply). Some wireless devices 14 in this described embodiment may be programmed to not divulge device identifiers, affiliations with a company or a service, etc.

In particular, company policy, or other policy, may determine whether wireless device 14 responds to some, all or none of received node interrogation requests and may be configurable by the owner of device 14, a node administrator, or both. This capability to reply or not according to one embodiment may reduce vulnerability of wireless devices 14 to undesired tracking compared with tag devices such as RFID or Bluetooth.

The above-mentioned monitoring operations may be implemented using only node device 16 in configurations of monitoring system 12 wherein node device 16 operates as a stand alone device. The above operations are described below with respect to embodiments of monitoring system 12*a* where node devices 16 communicate with management device 30 in arrangements where external device 40 is or is not present.

Initially, one embodiment of system 12*a* including plural node devices 16 is described where monitoring system 12*a* does not communicate with or utilize an external device 40 for verification operations (i.e., external device 40 may not be present) but rather management device 30 performs analysis in addition to analysis performed by node device 16.

As described above, an individual node device 16 may monitor for and detect the presence of wireless devices 14 at one or more monitored secure areas 10. The node device 16 may interrogate the detected wireless device 14 and receive replies therefrom. The node device 16 may communicate the reply, for example including an identifier and device configuration information for the wireless device 14, to management device 30. The communication from node device 16 to management device 30 may be encrypted and communicated over a secure communication channel (e.g., using an internal network, intranet or Internet) in one embodiment.

Storage circuitry of management device 30 may include a database comprising information regarding authorized wireless devices 14. The processing circuitry of the management device 30 may determine if the device identifier received from a node device 16 indicates an appropriate wireless device 14. If not, the management device 30 may provide an alarm or other indication and/or communicate a reply to the respective node device 16 which may provide an alarm or other indication that the wireless device 14 is not authorized. In one embodiment, a node device 16 may also control a lock to preclude access to the secure area 10 if a device 14 is unauthorized.

If management device 30 does recognize the wireless device 14 as being authorized using the device identifier, the management device 30 may extract authentication data (e.g., stored configuration information) for the respective device 14. Processing circuitry of the management device 30 may compare the stored configuration information with the device configuration information received from the device 14. Management device 30 and/or the respective node device 16 may generate an alarm or other indication if the stored and device configuration information differ.

Otherwise, if the stored and device configuration information match, the management device 30 may communicate an authorized signal to the respective node device 16. The node device 16 may generate an indication that the wireless device 14 is authorized or do nothing and permit the presence of the wireless device 14 in the secure area 10 in example embodiments. Communications between devices 16, 30 may be authenticated or verified in one embodiment and failure of authentication or verification may result in the identification of a wireless device as unauthorized.

In another embodiment of monitoring system 12*a*, an external device 40 is present. As mentioned previously, the monitoring system 12*a* and external device 40 may correspond to different organizations in one embodiment. The external device 40 may be implemented as a corporate PED server in one possible implementation and the external device 40 may have been previously enrolled/approved as a participating member of the coverage network of monitoring system 12*a*. One possible enrollment process may be established using secure keying and authentication data shared between devices 30, 40.

As described above, an individual node device 16 may monitor for and detect the presence of wireless devices 14 at one or more monitored secure areas 10. The node device 16 may interrogate the detected wireless device 14 and receive replies therefrom. The node device 16 may communicate the reply, for example including an identifier of the wireless device 14, an identifier of the CPS for the respective device 14, and device configuration information for the wireless device 14, to management device 30. The communication from node device 16 to management device 30 may be encrypted in one embodiment. The management device 30 may use the CPS identifier to route the communication to the respective external device 40 corresponding to the appropriate CPS, and for example, using a respective wireless network 50 and wireless service provider (WSP) 52 in one embodiment. In one embodiment, management device 30 may verify that the external device 40 is a subscribing member. If not, management device 30 and/or the respective node device 16 may generate an alarm or other appropriate indication that the wireless device 14 is unauthorized. The communications from node device 16 to management device 30 and to external device 40 may be encrypted and communicated over secure communication channels in one embodiment. For example, management device 30 may sign communications prior to communication thereof to external device 40. Management device 30 may also include an identifier of itself in the communication to external device 40 in one embodiment.

In one arrangement, the external device 40 may reside on a corporate internal network inside a firewall of the respective organization of the external device 40. In one embodiment, the communication to the external device 40 may be transmitted using the wireless network 50 and WSP 52 associated with the respective wireless device 14 and the internet 54 to provide connection to the external device 40, for example, embodied as a CPS.

Upon receipt, external device 40 may verify signatures of the wireless device 14, node device 16, and/or management device 30. Storage circuitry of external device 40 may include a database comprising information regarding authorized wireless devices 14 associated with the organization of the CPS and seeking to gain entry into one of the secure areas 10 of the organization associated with the monitoring system 12a. The processing circuitry of the external device 40 may determine if the device identifier indicates an appropriate wireless device 14. If not, the external device 40 may provide an alarm or other indication and/or communicate a reply to the management device 30 and respective node device 16 each of which may provide an alarm or other indication that the wireless device 14 is not authorized.

If external device 40 does recognize the wireless device 14 as being authorized, the external device 40 may extract stored configuration information for the respective device 14. Processing circuitry of the external device 40 may compare the stored configuration information with the device configuration information received from the device 14. The external device 40 may generate an alarm or other indication if the stored and device configuration information differ and/or communicate a reply to monitoring system 12a. Management device 30 and/or the respective node device 16 may also generate an alarm or other appropriate indication responsive to the reply from device 40.

Otherwise, if the wireless device 14 is authorized (e.g., stored and device configuration information match) and all authentications are verified, the external device 40 may communicate an authorized signal to the management device 30 of the respective monitoring system 12a. The management device 30 may verify or authenticate the authorized signal received from external device 40 and provide an authorized response to node device 16. In one embodiment, a secure data channel (e.g., encrypted data packets, digital signatures, public key infrastructure, etc.) intermediate devices 30, 40 and/or devices 16, 30 is used for communications and incoming packets are decrypted and their signatures checked to verify communications intermediate devices 30, 40 and/or devices 16, 20. Communications between devices 16, 30 and devices 30, 40 may be authenticated or verified in one embodiment and failure of authentication or verification may result in the identification of a wireless device 14 as unauthorized. In response to the authorizations from the devices 30, 40, the management device 30 and/or node device 16 may generate an indication that the wireless device 14 is authorized or do nothing and permit the presence of the wireless device 14 in the secure area 10 in example embodiments.

According to an additional embodiment of monitoring system 12a, management device 30 or external device 40 may maintain a list of secure areas 10 (e.g., of an organization) where a given wireless device 14 is authorized to be present. The communications to management device 30 and external device 40 may include an identifier of the respective node device 16 which detected the presence of the wireless device 14. Processing circuitry of devices 30, 40 may authenticate the identifier of node device 16 and/or compare the identifier of the node device 16 with the list of authorized secure areas 10 for the respective wireless device and may initiate an alarm or other indication as described herein if the wireless device 14 is unauthorized at the respective secure area 10 in which it is present.

In another embodiment, external device 40 may initiate a communication apart from monitoring system 12a to the wireless device 14 (e.g., using the wireless network 50). The communication may request an identifier of the node device 16 and/or management device 30 which was communicated from the node device 16 to the wireless device 14 during the interrogation. The wireless device 14 communicates the identifier of the node device 16 and/or management device 30 to the external device 40 which may use the identifier to authenticate components of the monitoring system 12a. An alarm or other indication may be generated by node device 16, management device 30 and/or external device 40 if the identifiers of the monitoring system 12a processed by the external device 40 do not match.

As discussed herein according to some example embodiments, the apparatus and methods of the disclosure may be used to verify that wireless devices 14 which are attempted to be brought into a secure area are permitted to be present in the secure area. The apparatus and methods may be used in one embodiment to verify that wireless devices 14 have not be altered, for example, to include malware or other system modifications. The apparatus and methods may be used in one embodiment to sound an alarm or other indication if non-approved or surreptitiously modified wireless devices 14 are present at a secure area 10. According to various embodiments of the disclosure, information is provided whether the configuration of a wireless device 14 has been changed and/or whether the wireless device 14 is permitted access to one or more secure area. Approved wireless devices 14 may be brought into and operated within secure areas 10 while providing information as to whether devices 14 have been modified, perhaps maliciously, according to some embodiments of the disclosure.

Referring to FIG. 6, an example of a process for identifying a wireless device 14 as authorized or unauthorized is shown according to one embodiment. Other methods are possible including more, less and alternative acts.

At an Act A10, a wireless device attempted to be brought into a secure area 10 is detected by a node device adjacent to secure area.

At an Act A12, the node device may query the detected wireless device for information.

At an Act A14, the wireless device obtains a response from the wireless device, for example, including a unique device identifier, CPS identifier (if appropriate), and/or device configuration information. The device may be identified as unauthorized if no response is received.

At an Act A16, the device identifier, CPS identifier and/or device configuration information are analyzed. A device may be identified as unauthorized if any of the device identifier, CPS identifier or device configuration information fails to be verified or authenticated during the analysis.

At an Act A18, in response to the analysis, the wireless device may be identified as one of authorized and unauthorized and be permitted or precluded from entry into the secure area.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

The invention claimed is:

1. A wireless device monitoring method comprising:
   monitoring within a secure area for the presence of wireless communications transmitted from a wireless device located within the secure area;
   issuing a request for device configuration information to the wireless device upon detection of the presence of the wireless communications;
   receiving device configuration information from the wireless device, wherein the received device configuration information complies with a security protocol, compliance with the security protocol including at least one of the received device configuration information being signed with a digital signature and the received device configuration information being encrypted;
   accessing stored device configuration information corresponding to the wireless device;
   comparing the received device configuration information with the stored device configuration information and indicating the wireless device as one of authorized and unauthorized for presence at the secure area responsive to the comparing.

2. The method of claim 1, wherein the received device configuration information includes a device identifier of the wireless device and the stored information includes the device identifier.

3. The method of claim 1 wherein the monitoring, issuing, receiving, accessing, comparing, and indicating are executed by a node device located at the secure area.

4. The method of claim 1 wherein the receiving and accessing is executed by a node device located at the secure area, the method further comprising:
   communicating the received and accessed device configuration information from the node device to a remote device, wherein the comparing is executed by the remote device.

5. The method of claim 4 wherein the node device and secure area is associated with a first organization and the remote device is associated with a second organization.

6. The method of claim 1 wherein the receiving and accessing is executed by a node device located at the secure area, the method further comprising:
   communicating the accessed and received device configuration information from the node device to a management device: and
   communicating the accessed and received device configuration information from the management device to a remote device comprising an external device associated with the wireless device, wherein the comparing is executed by the external device.

7. The method of claim 6 further comprising communicating an identifier of the management device from the wireless device to the remote device and verifying the identity of the management device using the identifier of the management device.

8. The method of claim 6 further comprising verifying an identity of the external device prior to communicating the accessed and received device configuration information to the remote device.

9. The method of claim 1 wherein the stored information comprises information regarding a configuration of the wireless device at a moment in time before the device configuration information is received, and wherein the indicating comprises indicating the wireless device as being unauthorized responsive to the device configuration information being different than the stored information.

10. The method of claim 1, further comprising:
    accessing a list of authorized secure areas for the wireless device: comparing the secure area the wireless devices is located in with the list of authorized secure areas; and
    indicating the wireless device as being at least one of authorized and unauthorized responsively to the comparison using the list.

11. The method of claim 1, further comprising:
    disabling a function performed by the wireless device responsively to the comparing.

12. The method of claim 11, wherein the received device configuration information includes and the stored information includes the device identifier.

13. The method of claim 11 further comprising:
    communicating the received and accessed device configuration information from the node device to a remote device, wherein the comparing is executed by the remote device.

14. The method of claim 11 further comprising:
    communicating the accessed and received device configuration information from the node device to a management device: and
    communicating the accessed and received device configuration information from the management device to a remote device comprising an external device associated with the wireless device, wherein the comparing is executed by the external device.

15. The method of claim 14, further comprising:
    communicating, by the management device, an identifier of the management device from the wireless device to the remote device; and verifying, by the remote device, the identity of the management device using the identifier of the management device.

16. The method of claim 14, further comprising verifying an identity of the external device prior to communicating the accessed and received device configuration information to the remote device.

17. The method of claim 11 wherein the stored information comprises information regarding a configuration of the wireless device at a moment in time before the device configuration information is received, and wherein the indicating comprises indicating the wireless device as being unauthorized responsive to the device configuration information being different than the stored information.

18. The method of claim 11, further comprising:
accessing, by the node, a list of authorized secure areas for the wireless device:
comparing the secure area the wireless devices is located in with the list of authorized secure areas; and
indicating, by the node, the wireless device as being at least one of authorized and unauthorized responsive to the comparison using the list.

19. A wireless device monitoring system comprising:
a plurality of node devices associated with respective ones of a plurality of secure areas, wherein the node devices are individually configured to detect the presence of wireless devices at a respective one of the secure areas associated with the individual node device and receive device configuration information from the wireless devices, wherein the received device configuration information complies with a security protocol, compliance with the security protocol including at least one of the received device configuration information being signed with a digital signature and the received device configuration information being encrypted and transmit the received device configuration information to a management device; and
the management device coupled with the node devices and configured to receive the information regarding the wireless devices from the node devices, analyze the information, and to indicate, for an individual one of the node devices, whether respective ones of the wireless devices are authorized or unauthorized with respect to the respective one of the secure areas.

20. The system of claim 19 wherein the node devices are configured to receive device identifiers from the wireless devices, and wherein the management device is configured to indicate individual ones of the wireless devices as being authorized or unauthorized with respect to respective ones of the secure areas using the device identifiers.

21. The system of claim 19 wherein the node devices are configured to receive device configuration information from the wireless devices, and wherein the management device is configured to indicate individual ones of the wireless devices as being authorized or unauthorized with respect to respective ones of the secure areas using the device configuration information.

22. The system of claim 21 wherein the management device is configured to store information regarding configurations of the wireless devices, and wherein the management device is configured to indicate individual ones of the wireless devices as being authorized or unauthorized responsive to comparisons of the device configuration information with the stored information.

23. The system of claim 19 wherein the management device is configured to indicate one of the wireless devices as being unauthorized with respect to one of the secure areas and authorized with respect to another of the secure areas using a list of authorized secure areas for the one wireless device.

24. The system of claim 19 wherein the management device is associated with a first organization, and wherein the management device is configured to output the information regarding the wireless devices to an external device associated with a second organization, and wherein the management device is configured to indicate the wireless devices as being authorized or unauthorized with respect to the respective one of the secure areas responsive to responses from the external device associated with the second organization.

25. The system of claim 19, wherein at least one of the node device and the management device are configured to disable a function performed by the wireless device responsively to the comparing.

26. An article of manufacture comprising:
media comprising programming configured to cause processing circuitry to perform processing comprising:
monitoring within a secure area for the presence of wireless communications transmitted from a wireless device located within the secure area;
issuing a request for device configuration information to the wireless device upon detection of the presence of the wireless communications;
receiving device configuration information from the wireless device, wherein the received device configuration information complies with a security protocol, compliance with the security protocol including at least one of the received device configuration information being signed with a digital signature and the received device configuration information being encrypted;
accessing stored device configuration information corresponding to the wireless device;
comparing the received device configuration information with the stored device configuration information; and
indicating the wireless device as one of authorized and unauthorized for presence at the secure area responsive to the comparing.

27. The article of claim 26 wherein the stored information comprises information regarding a configuration of the wireless device at a moment in time before the device configuration information is received, and wherein the indicating comprises indicating the wireless device as being unauthorized responsive to the device configuration information being different than the stored information.

28. The article of claim 26 wherein the indicating comprises indicating the wireless device as being unauthorized responsive to the device configuration information not matching the stored configuration information.

29. The article of claim 26, wherein the processing further comprises:
disabling a function performed by the wireless device responsively to the comparing.

* * * * *